United States Patent
Youn et al.

(10) Patent No.: US 6,954,242 B2
(45) Date of Patent: Oct. 11, 2005

(54) LIQUID CRYSTAL DISPLAY PANEL AND METHOD FOR MANUFACTURING THE SAME

(75) Inventors: Won Gyun Youn, Kyongsangbuk-do (KR); Kyeong Jin Kim, Kyongsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 87 days.

(21) Appl. No.: 09/973,932

(22) Filed: Oct. 11, 2001

(65) Prior Publication Data

US 2002/0047963 A1 Apr. 25, 2002

(30) Foreign Application Priority Data

Oct. 25, 2000 (KR) .................................. P2000-62983

(51) Int. Cl.$^7$ ..................... G02F 1/1333; G02F 1/1339
(52) U.S. Cl. ..................... 349/110; 349/153; 349/149
(58) Field of Search ................. 349/110–111, 152–153, 349/149

(56) References Cited

U.S. PATENT DOCUMENTS

| | | | |
|---|---|---|---|
| 4,691,995 A | | 9/1987 | Yamazaki et al. ...... 350/331 R |
| 4,935,757 A | * | 6/1990 | Hatano et al. ............. 349/106 |
| 5,132,830 A | * | 7/1992 | Fukutani et al. ........... 349/106 |
| 5,745,202 A | * | 4/1998 | Yamauchi et al. ......... 349/110 |
| 5,844,645 A | * | 12/1998 | Kashimoto ................. 349/106 |
| 5,889,569 A | * | 3/1999 | Okamoto et al. .......... 349/110 |

FOREIGN PATENT DOCUMENTS

| | | |
|---|---|---|
| KR | 6-235925 | 8/1994 |
| KR | 8-101395 | 4/1996 |
| KR | 9-61829 | 3/1997 |
| KR | 10-177178 | 6/1998 |
| KR | 10-333157 | 12/1998 |
| KR | 10-333159 | 12/1998 |
| KR | 11-42864 | 5/1999 |
| KR | 11-133438 | 5/1999 |
| KR | 11-248930 | 9/1999 |
| KR | 11-326922 | 11/1999 |

\* cited by examiner

*Primary Examiner*—Toan Ton
(74) *Attorney, Agent, or Firm*—Morgan Lewis & Bockius LLP

(57) ABSTRACT

An LCD panel and a method for manufacturing the same facilitate more efficient hardening a UV-type hardening sealant suitable for a large size panel. The LCD panel includes first and second substrates, an active region defined on the first substrate and provided with a plurality of TFT's and pixel electrodes, a sealing region defined along a periphery of the active region, a light-shielding region defined on the second substrate other than on the sealing region, and a liquid crystal region between the first and second substrates. The method for manufacturing an LCD panel includes the steps of preparing first and second substrates, forming a plurality of patterns in an active region on the first substrate, forming a UV hardening type sealant along a periphery of the active region, forming a light-shielding layer on the second substrate so as not to shield the sealant, attaching the first and second substrates to each other, and irradiating the sealant with UV-rays to harden the sealant.

4 Claims, 7 Drawing Sheets

LIQUID CRYSTAL DISPLAY PANEL AND METHOD FOR MANUFACTURING THE SAME

This application claims the benefit of Korean Patent Application No. P 2000-62983, filed on Oct. 25, 2000, which is hereby incorporated by reference.

BACKGROUND OF THE INVENTION

1. Field of the Invention

The present invention relates to a display device, and more particularly, to a liquid crystal display (LCD) panel and a method for manufacturing the same.

2. Discussion of the Related Art

Rapid development within the fields of information and communication has caused an increase in the demand for thin, lightweight and low cost display devices for viewing information. Industries that develop displays are responding to these needs by placing high emphasis on developing flat panel type displays.

Historically, the Cathode Ray Tube (CRT) has been widely used as a display device in applications such as televisions, computer monitors, and the like, because CRT screens can display various colors having high brightness. However, the CRT cannot adequately satisfy present demands for display applications that require reduced volume and weight, portability, and low power consumption while having a large screen size and high resolution. Out of this need, the display industry has placed high emphasis on developing flat panel displays to replace the CRT. Over the years, flat panel displays have found wide use in monitors for computers, spacecraft, and aircraft. Examples of flat panel display types currently used include the LCD, the electroluminescent display (ELD), the field emission display (FED), and the plasma display panel (PDP).

Characteristics required for an ideal flat panel display include a light weight, high luminance, high efficiency, high resolution, high speed response time, low driving voltage, low power consumption, low cost, and natural color.

Currently, the LCD device is widely used as a monitor for portable computers. These LCD's typically include two opposing glass substrates, between which is sealed a layer of liquid crystal. A plurality of pixel patterns is formed on one of the glass substrates, and a color filter layer is provided on the other substrate.

The two glass substrates are attached to each other using sealant that serves to attach and fix the two glass substrates to each other. Since liquid crystal has low specific resistance and easily absorbs moisture in the air, it is susceptible to incorporating impurities. Accordingly, the sealant used to attach the two glass substrates must also resist permeation of external moisture that can adversely affect the liquid crystal provided between the glass substrates.

Sealants presently used include inorganic and organic sealants. Inorganic sealant has been traditionally used for sealing an LCD. However, with currently developed liquid crystal materials, inorganic sealant generally is no longer used. Instead, organic epoxy based resins, such as phenol-based or acryl-based resins, are presently used as an LCD sealant. Epoxy based sealants can generally be divided into either a two-liquid state type that requires mixing a main material with a hardener, or a one-liquid state type that includes hardener already incorporated into the main material.

Depending on the hardening type, organic resin sealant is generally hardened by either a thermal process or exposure to ultra-violet (UV) rays. In either case, high adhesion strength, high crystallization ratio, and exceptional printing performance are required to obtain a seal with high reliability. Uniform distribution of organic sealant also is necessary to accurately control a liquid crystal cell gap while pressuring, heating, and hardening the glass substrates.

Thermal hardening resin has high mechanical strength, high adhesion strength, and high cross-linkage at a high temperature. Epoxy and phenol resins are mainly used as a thermal hardening resin. However, UV-type hardening resin is most often used for sealing large size display panels because, compared to thermal hardening resin, it hardens at low temperature, has reduced hardening time and improves adhesion. Moreover, when a thermal hardening resin is applied to large sized substrates, thermal expansion of the resins often occurs.

Various methods are currently used to inject liquid crystal between opposing glass substrates of an LCD. Two representative methods described below include a first method that injects liquid crystal into a cell using a pressure difference by maintaining a vacuum state within the cell, and a second method that distributes liquid crystal under a decompression state.

In the first method, a liquid crystal panel on which a sealant is printed is placed in a vacuum chamber. The chamber pressure is gradually reduced until an inner portion of the liquid crystal panel reaches a low-pressure state that is close to vacuum. While the inner portion of the liquid crystal panel is maintained at the low-pressure state, a liquid crystal injection hole is placed in contact with liquid crystal located outside the liquid crystal panel. Air is then introduced into the chamber to cause external pressure on the liquid crystal panel to gradually increase to a high level. Consequently, because of the existing pressure differential between the inner and outer portions of the panel, liquid crystal is injected into the panel under a vacuum state to form a liquid crystal layer between the first and second glass substrates.

In the second method for distributing liquid crystal, a sealant is first patterned on one of the glass substrates. After the sealant is patterned, liquid crystal is dropped onto the substrate using a dispenser. This method has an advantage in that the injection speed of the liquid crystal is higher compared to methods based on osmotic pressure. This method also has an advantage in that injection time of the liquid crystal is short for large sized substrates.

A related art LCD panel is now described with reference to FIGS. 1A to 1C. FIG. 1A is a plan view of a first substrate in which thin film transistors (TFTs) 17 and pixel electrodes 19 are patterned. FIG. 1B is a cross-sectional view I-I' of the structure shown in FIG. 1A that shows a TFT 17, an extended gate line 13a, the connection of the pixel electrode 19 to a source/drain of the TFT 17, and the first substrate 11. FIG. 1C is a cross-sectional view of an second substrate 11a, on which are formed a color filter pattern 21, a light shielding layer 23 and a common electrode 25.

As shown in FIG. 1A, a first substrate 11 includes a plurality of gate lines 13a formed along a first direction on the substrate. A plurality of data lines 15a are formed along a second direction on the first substrate 11 and cross each of the gate lines 13a. TFTs 17 and pixel electrodes 19 are formed in an active region A at each crossing point between a gate line 13a and a data line 15a. Each of the gate lines 13a and the data lines 15a extend to a pad region located at the display periphery outside the active region and are respectively electrically connected with a gate driving circuit (not shown) and a data driving circuit (not shown).

FIG. 1B shows a cross-sectional view of a gate line extension from the active region A where the TFTs 17 and the pixel electrodes 19 are formed. As shown in FIG. 1C, the second substrate 11a includes the plurality of color filter patterns 21, the light-shielding layers 23 for shielding regions other than the pixel electrodes 19 from light, and the transparent common electrode 25.

FIGS. 2 and 3 are respectively simplified plan and cross-sectional views of the related art LCD after the first substrate 11 is joined with the second substrate 11a. As shown in FIG. 2, the light-shielding layer 23 is patterned into a matrix arrangement in the active region A. Light-shielding layer 23 also is formed along a periphery of the active region A and covers the sealing regions of the substrates where sealant 27 is formed.

Referring to FIG. 3, the first substrate 11 is shown provided with the gate lines 13a and the data lines 15a (not shown), and the second substrate 11a is shown provided with the light-shielding layers 23. The sealant 27 is formed outside the periphery of the active region A and attaches the first substrate 11 to the second substrate 11a. The sealant 27 is a thermal hardening type that forms a seal in a pad region P between the light-shielding layer 23 on the second substrate 11a and the gate lines 13a and data lines 15a (and areas therebetween) formed on the first substrate 11.

The related art LCD panel that utilizes thermal hardening type sealant has several drawbacks. First, a high temperature heat must be applied to the sealant in order for it to harden. Heating the substrates at high temperatures may cause an increase in substrate stress due to thermal expansion of the sealant. Another drawback is the long hardening time typically required for thermal hardening type sealant.

Furthermore, the current trend toward large size panels generally makes it more desirable to use UV hardening type sealant. However, since an upper portion of the sealing region S is covered with the light-shielding layer, the transmission of UV-rays are substantially prevented from directly irradiating the sealant, thus making it difficult or impractical to use UV hardening type sealant.

Thus, there remains a need in the art for an LCD panel sealing structures and processes that avoid the disadvantages associated with high temperature sealing processes or the manufacturing complexities currently associated with UV-type hardening sealant.

SUMMARY OF THE INVENTION

Accordingly, the present invention is directed to an LCD panel and a method for manufacturing the same that substantially obviates one or more of the problems due to limitations and disadvantages of the related art.

In the LCD panel of the present invention, since a sealant provided within the panel can easily be hardened by transmitting UV-rays through an second substrate of the panel in areas absent a light-shielding material, UV-type hardening sealant may be used. The present invention is therefore useful for forming reliable, low cost, and/or high yield LCD panels, particularly large sized LCD panels.

Additional features and advantages of the invention will be set forth in the description that follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages in accordance with the present invention, as embodied and broadly described, the liquid crystal display panel includes first and second substrates, an active region on the first substrate, the active region including a plurality of thin film transistors and pixel electrodes, a sealing region along a periphery of the active region and along a corresponding region of the second substrate, sealant in the sealing region, the sealant attaching the first substrate and the second substrate to one another and maintaining a gap therebetween, a light-shielding layer on the second substrate, the light-shielding layer being substantially absent in the sealing region at least where the sealant attaches to the second substrate, and a liquid crystal layer within the gap and on the active region side of the sealant.

In another aspect of the present invention, a method of manufacturing an LCD panel includes forming a plurality of pixel electrodes in an active region on a first substrate, applying UV-type hardening sealant on a sealing region positioned along a periphery of the active region, forming a light-shielding layer on a second substrate except at least in areas where the UV-type hardening sealant is to be attached, attaching the first and second substrates to each other, and irradiating UV-rays to the sealant to harden the sealant.

In yet another aspect of the present invention, a method of manufacturing an LCD panel includes forming an UV-type hardening sealant in a first sealing region of a first substrate, dropping liquid crystal on a surface of the first substrate, forming a light-shielding layer on portions of a second substrate for preventing light from being transmitted through the portions of the second substrate and allowing light to transmit through the other portion of the substrate. The portions of a second substrate for preventing light from being transmitted through the portions of the second substrate do not include a second sealing region of the second substrate where attachment to the sealant is intended. The first and second substrates are attached to each other at the first and second sealing regions and UV-rays are used to harden the sealant.

In yet still in another aspect of the present invention, a liquid crystal display (LCD) panel includes a first substrate including at least one pixel electrode, a second substrate opposing the first substrate, a first sealing area of the first substrate surrounding the pixel electrode, a second sealing area of the second substrate corresponding to the first sealing area, and UV-type hardening sealant between the first and second substrates and contacting the first and second sealing areas. The UV-type sealant forms a liquid crystal filled enclosure with the first and second substrates. A light-shielding film is formed on the second substrate, but is absent from at least the second sealing area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
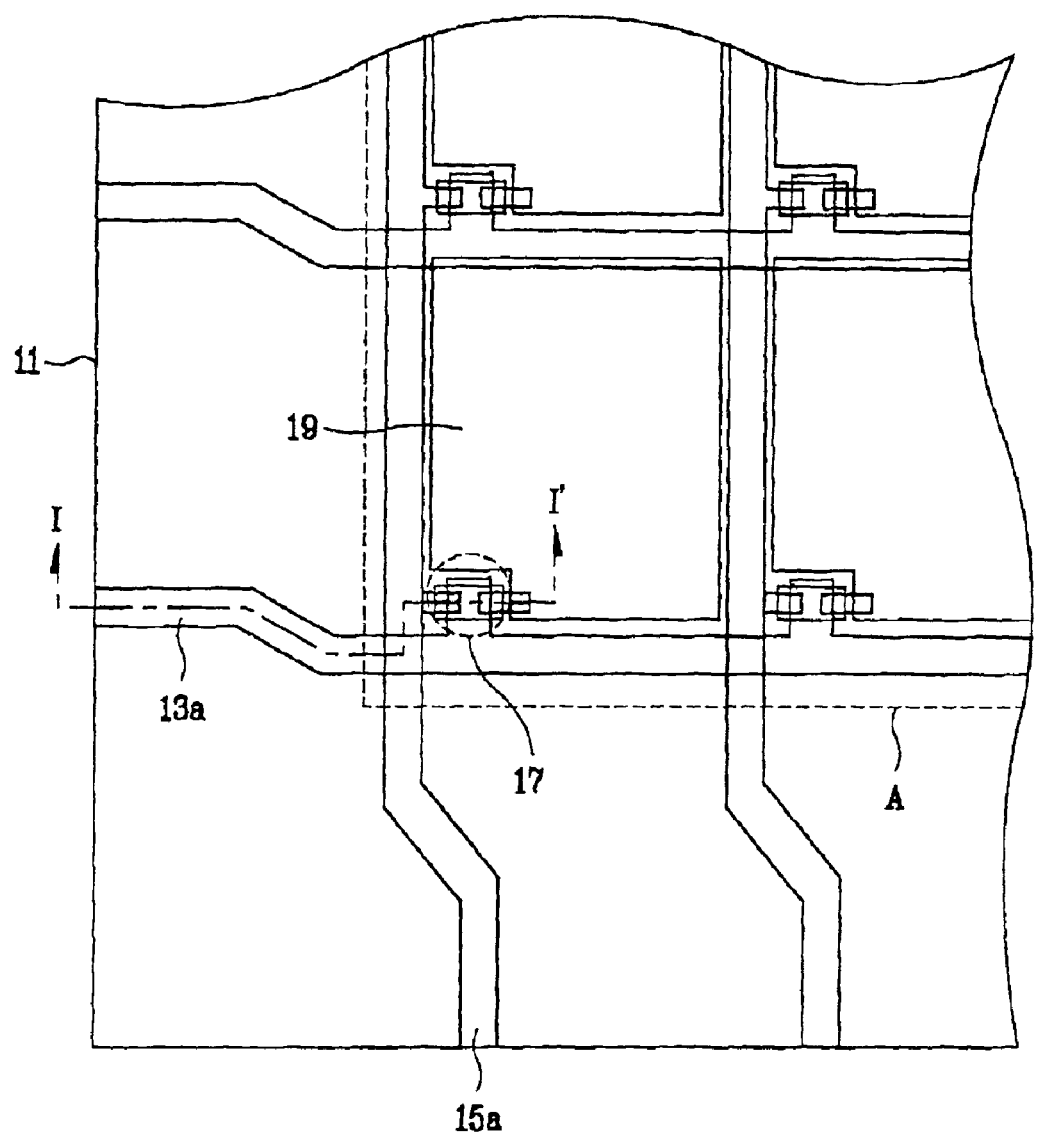
FIG. 1A provides a simplified plan view illustrative of a first substrate of a related art LCD panel.
Figure 1B:
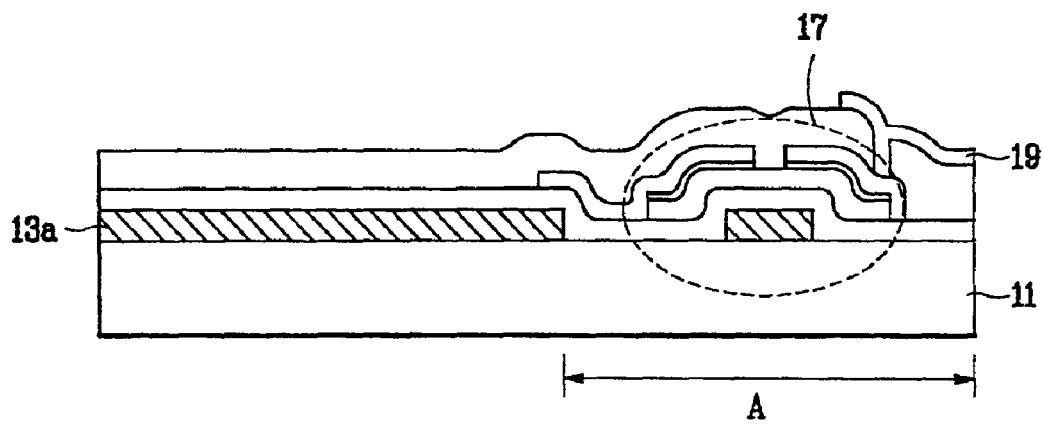
FIG. 1B is a cross-sectional view taken along line I—I' of FIG. 1A.
Figure 1C:
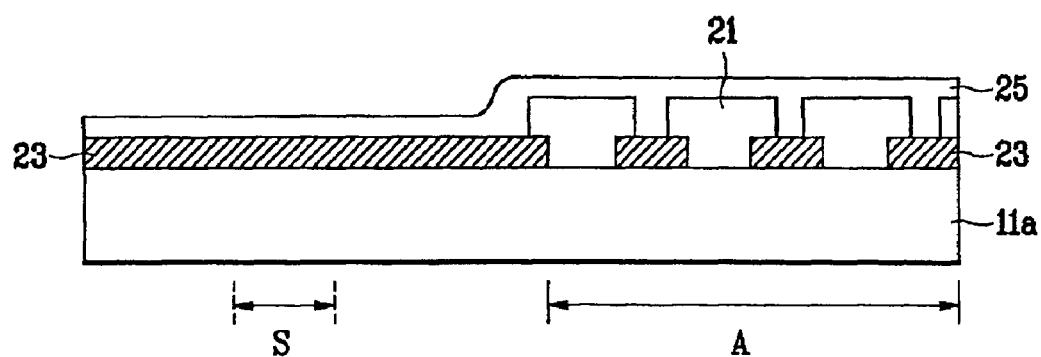
FIG. 1C provides a cross-sectional view illustrative of an second substrate of a related art LCD panel.
Figure 2:
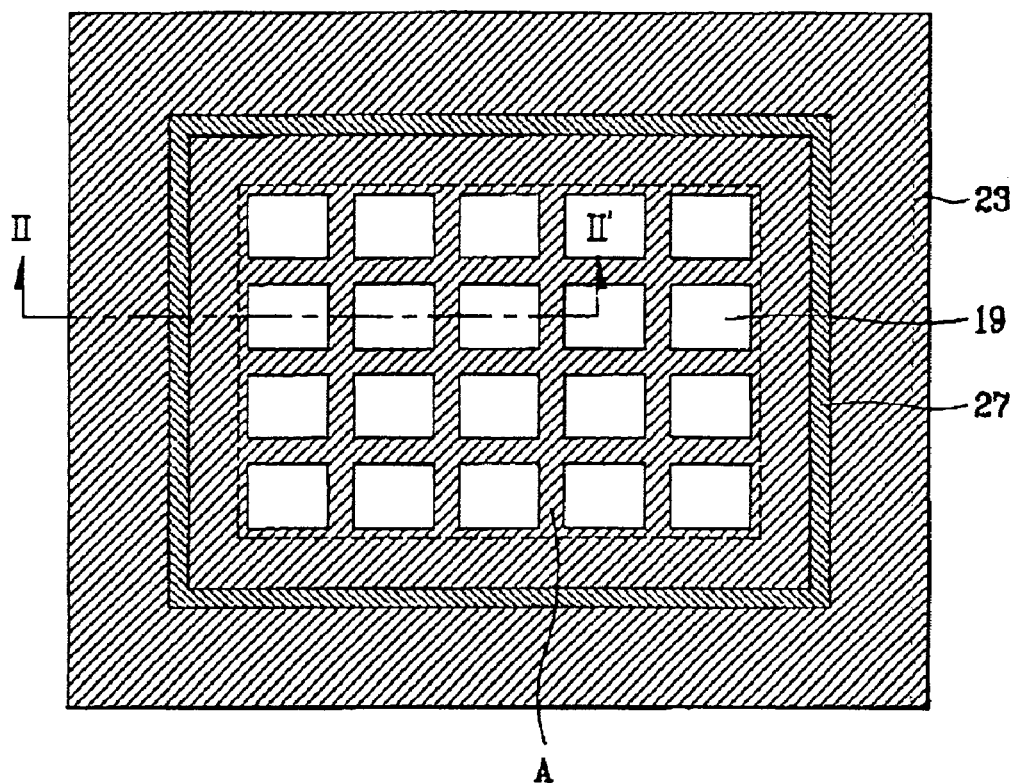
FIG. 2 provides a plan view illustrative of a related art LCD panel.
Figure 3:
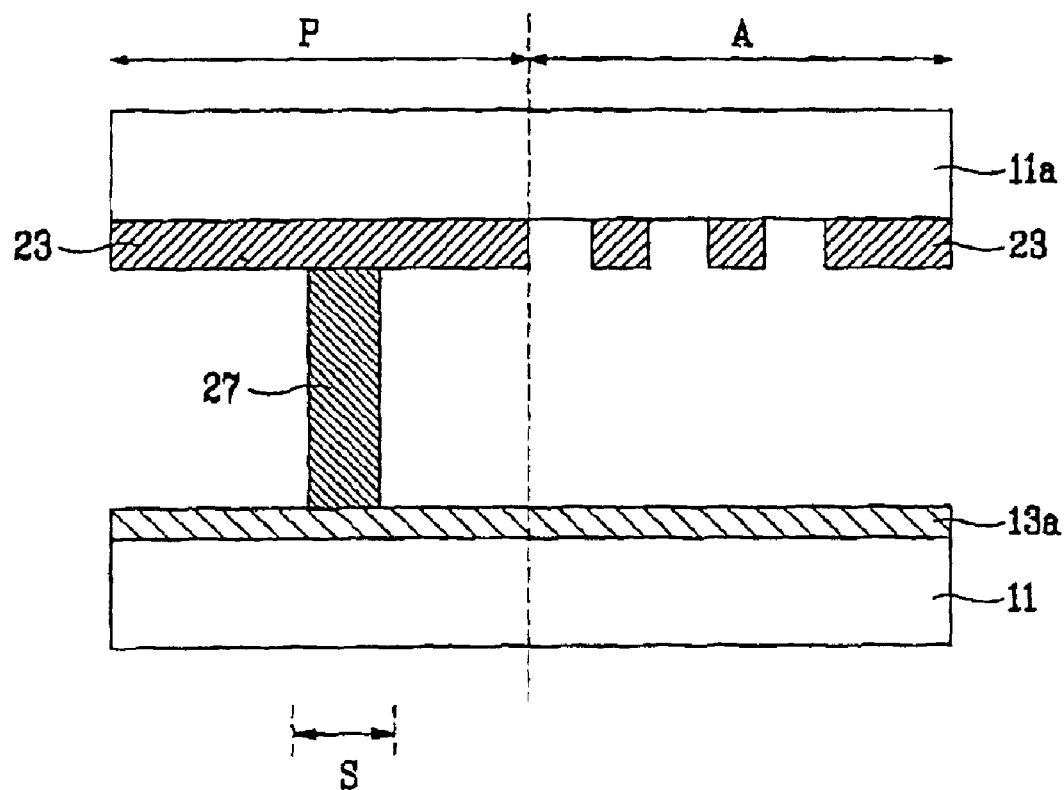
FIG. 3 is a cross-sectional view taken along line II–II' of FIG. 2.
Figure 4:
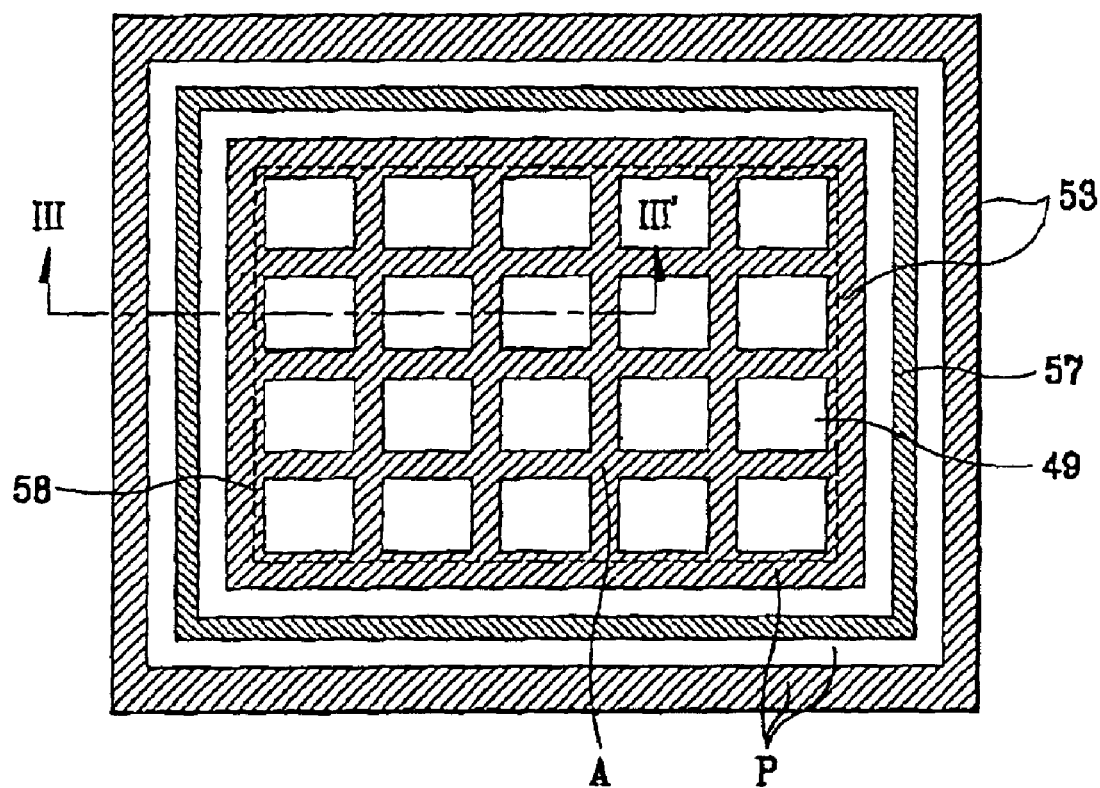
FIG. 4 provides a plan view illustrative of an exemplary LCD panel according to the present invention.

FIG. 4 is a plan view of an exemplary LCD panel embodiment of the present invention. As shown in FIG. 4, the LCD panel according to the present invention includes an active region A within the perimeter defined by dotted line 58 and a pad region P in areas outside the perimeter. The active region A may be provided with a plurality of TFTs that switch data signals representing an image onto pixel electrodes 49 displaying the image.

Figure 5:
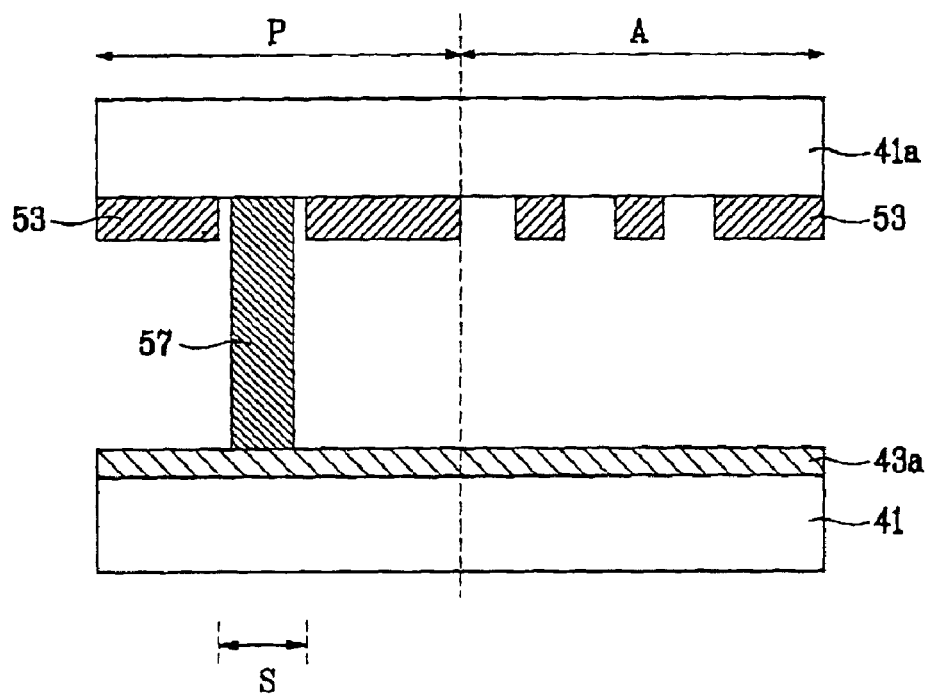
FIG. 5 is a cross-sectional view taken along line III–III' of FIG. 4.

As shown in FIG. 5, a sealant 57 is provided in a sealing region S defined outside and along a periphery of the active region A. A light-shielding layer 53 may be formed in the active region A and in the pad region P, but light-shielding layer 53 is not formed the sealing region S. The sealant 57 may be formed between a first substrate 41 and a second substrate 41a as two or more separate lines of sealant surrounding the active region A to prevent leakage of the liquid crystal layer from the active region A.

The light-shielding layer 53 may be arranged in a matrix configuration within the active region A to shield regions other than the pixel electrodes from light. However, the light-shielding layer 53 is not formed in the sealing region S where the sealant 57 is to be formed. UV-rays are thus allowed to transmit through the unshielded portion of the second substrate 41a and irradiate and harden the sealant 57. Accordingly, since the sealing region S does not include a light-shielding layer 53, UV-type hardening sealant may be used more efficiently with the present invention.

Figure 6:
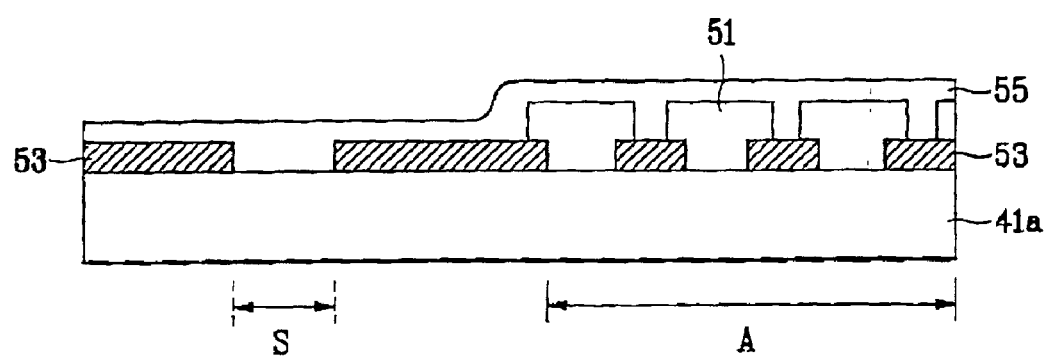
FIG. 6 is a cross-sectional view illustrative of an second substrate of an exemplary LCD panel according to the present invention.

FIG. 6 is a cross-sectional view of a second substrate of the LCD panel according to an exemplary embodiment of the present invention. The light-shielding layer 53 may be formed on a second glass substrate 41a, but another substrate material may be used, such as a plastic material (e.g., PET). As described above, the light-shielding layer 53 may be arranged in a matrix configuration within the active region A and is formed in a region of the pad region P other than a region S where UV-type hardening sealant 57 is to be formed.

A more detailed description of the first substrate 41 and the second substrate 41a is now provided. As shown in FIG. 5, the first substrate 41, a gate line 43a is shown extending to the pad region P. Although not shown, a gate electrode is formed on a first substrate 41 and a gate insulating film is formed on substantially the entire substrate surface including the gate electrode.

The gate electrode may be formed by a metal such as Al, Cr, Mo, Cu, or Al alloy by a deposition and patterning process, such as a sputtering process followed by metal patterning, for example. The gate insulating film may be formed of $SiN_x$ or $SiO_x$ by various processes, such as a chemical vapor deposition (CVD) process, for example. The gate insulating film may alternatively be formed of organic films, such as benzocyclobutene (BCB), to improve aperture ratio.

Thereafter, a semiconductor channel layer and an ohmic contact layer of the TFT are formed on the gate insulating film. Source and drain electrodes are then formed on the ohmic contact layer and a data line is then formed to cross the gate line and connect to the source electrode of the TFT.

At this time, the data line and source/drain electrodes may be formed of the same metal material as the gate line and the gate electrode. Subsequently, a passivation film, such as $SiN_x$, $SiO_x$ or BCB, is formed on substantially the entire surface of the first substrate 41 including the TFT, the gate lines and the data lines. Then, pixel electrodes 49 are formed on the passivation film in a pixel region and are connected with an associated drain electrode of the TFT through a contact hole in the passivation film. Thus, a process for manufacturing a TFT substrate (first substrate) is completed.

Meanwhile, as shown in FIG. 6, the second substrate 41a is provided with a light-shielding layer 53 that prevents light from being transmitted to the regions other than the pixel electrodes 49 formed in the first substrate 41. If a color display is desired, red, green, and blue (RGB) color filter patterns 51 may be formed on and/or between the light-shielding layer 53 to display colors.

The light-shielding layer 53 may have a matrix arrangement in the active region A. To form the light-shielding layer in a matrix configuration, a light-shielding material film is first formed on the second substrate 41a to shield the second substrate from light. Then, the light-shielding material film may be etched using a photo mask of which a portion corresponding to the active region A is opened in a matrix arrangement while a portion corresponding to the sealing region S is completely opened. Thus, the light-shielding layer 53 is formed in a matrix arrangement in the active region A, and at the same time, is formed in the pad region P other than the sealing region S.

Subsequently, a transparent common electrode 55 is formed on the color filter pattern 51 and the light-shielding layer 53. Then, the process for manufacturing a color filter substrate (second substrate) is completed. To obtain uniformity of the color filter patterns 51, an overcoat layer may be formed before forming the transparent common electrode. After the plurality of films and film patterns described in the foregoing are formed on the first substrate 41 and the second substrate 41a, an alignment film (not shown) may be formed on one of the first and second substrates 41, 41a, or on both substrates.

A liquid crystal layer is then formed between the first and second substrates 41 and 41a. Thus, the process for manufacturing an LCD panel according to the present invention is completed. The liquid crystal layer may have a positive dielectric anisotropy or a negative dielectric anisotropy, and may further include a chiral dopant. The liquid crystal layer may be formed within the LCD panel substrates 41, 41a by a general liquid crystal injection method or a dispenser method, such as those described above.

Figure 7:
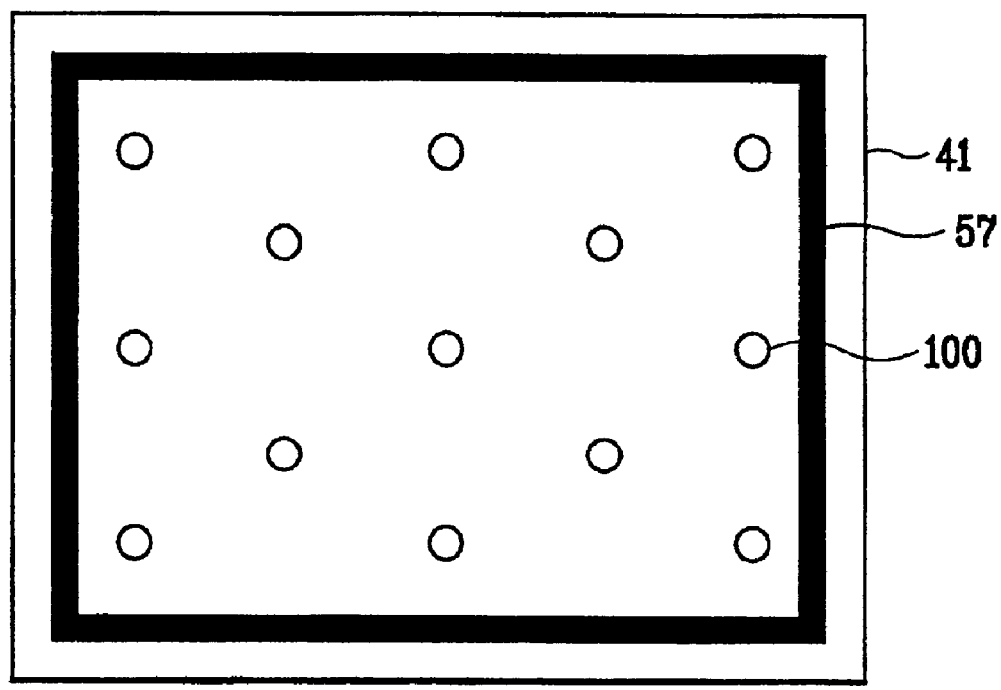
FIG. 7 is a plan view illustrative of an exemplary method used to form the LCD panel according to the present invention.

If the liquid crystal layer is formed by a dispenser method, as shown in FIG. 7, the UV-type hardening sealant 57 is formed on the first substrate 41 in a predetermined pattern. Liquid crystal 100 is then dropped on a surface of the first substrate 41 surrounded by the sealant 57. The sealant 57 may be formed on the second substrate 41a. The first substrate 41 is attached to the second substrate 41a under vacuum state or at atmospheric pressure. At this time, one or more spacers (not shown) may be formed on the second substrate 41a to uniformly maintain a cell gap. The space may be formed on the first substrate 41.

The process for opening the sealing region may include a step of removing a light-shielding layer formed on the first substrate 41 in addition to the second substrate 41a. In other words, in the first substrate 41, there are materials that can shield light, such as a gate line and data line metal. Unnecessary metal portions of metal other than portions necessary to operate the liquid crystal may be removed in a region where the UV-type hardening sealant is to be formed.

In the above-described embodiment of the present invention, any liquid crystal display mode may be used. For example, the present invention may be practiced with twisted nematic (TN), super twisted nematic (STN), ferroelectric liquid crystal (FLC), antiferroelectric liquid crystal (AFLC), cholesteric liquid crystal display (Ch-LCD), vertically aligned (VA), in-plane switching (IPS), and/or optically-controlled bifringence (OCB) display modes. While the foregoing LCD embodiment includes TFT's, the invention also may be used in matrix drive systems. If a TFT-LCD mode is desired, the TFT's may be formed of any suitable semiconductor material, such as polycrystalline silicon, amorphous silicon and/or recrystallized silicon, or of semiconductor material other than silicon.

By using UV-type hardening sealant to seal and attach panel substrates to each other, the sealant can be hardened in an uncomplicated process by removing the light-shielding layer on a color filter substrate corresponding to the sealing region so that the sealing region can easily be irradiated with UV-radiation. The present invention is particularly useful for producing large size panel displays reliably, at low cost, and/or in an uncomplicated manner.

It will be apparent to those skilled in the art that various modifications and variations can be made without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A liquid crystal display (LCD) panel comprising:

first and second substrates;

an active region on the first substrate, the active region including a plurality of thin film transistors and pixel electrodes;

a pad region along a periphery of the active region and along a corresponding region of the second substrate, wherein at least one of gate and data lines extends to the pad region of the first substrate;

a sealing region between the active region and the pad region;

sealant in the sealing region between the first and second substrates, the sealant attaching the first substrate and the second substrate to each other;

a light-shielding layer in the pad and active regions except the sealing region on the second substrate, a portion of the light-shielding layer that is in the pad region of the second substrate being located directly above the pad region of the first substrate having one of the gate and data lines extended thereto; and a liquid crystal layer within the gap and on the active region side of the sealant.

2. The LCD panel of claim 1, wherein the sealant is an UV-type hardening sealant.

3. The LCD panel of claim 1, wherein the light-shielding layer is formed of a light-shielding material.

4. The LCD panel of claim 1, wherein the light-shielding layer has a matrix arrangement in the active region.

* * * * *